United States Patent [19]

Hama et al.

[11] Patent Number: 5,265,265
[45] Date of Patent: Nov. 23, 1993

[54] WRISTWATCH RADIO COMMUNICATION DEVICE HAVING AN IMPROVED NOISE SHIELDING STRUCTURE

[75] Inventors: Norio Hama; Shyogo Kurosawa, both of Nagano, Japan

[73] Assignee: Seiko Epson Corporation, Tokyo, Japan

[21] Appl. No.: 652,714

[22] Filed: Feb. 8, 1991

[30] Foreign Application Priority Data

Feb. 9, 1990 [JP] Japan ................................ 2-30332
Jun. 8, 1990 [JP] Japan ................................ 2-150170
Jun. 11, 1990 [JP] Japan ................................ 2-152388
Oct. 16, 1990 [JP] Japan ................................ 2-278245

[51] Int. Cl.$^5$ ............................................. H04B 1/12
[52] U.S. Cl. ................................. 455/300; 455/280; 455/343; 455/344; 455/347; 340/825.44; 361/818
[58] Field of Search ............... 455/300, 301, 298, 299, 455/343, 347–349, 89, 90, 74, 274, 82, 100, 129, 269, 280, 344, 351, 283; 361/422, 424, 415; 340/825.44, 311.1

[56] References Cited

U.S. PATENT DOCUMENTS 4,419,770 12/1983 Yagi et al. .......................... 455/301
4,680,676 7/1987 Petratos et al. ................. 455/301 X
4,713,808 12/1987 Gaskill et al. ............... 340/825.44 X

*Primary Examiner*—Reinhard J. Eisenzopf
*Assistant Examiner*—Chi Pham
*Attorney, Agent, or Firm*—Blum Kaplan

[57] ABSTRACT

A portable radio communication device such as wristwatch receiver and/or transmitter is provided with an effective noise shielding structure. The portable radio communication device includes a high frequency analog circuitry for receiving and transmitting radio signals and further includes digital circuitry for data processing and display. The noise shielding structure protects high frequency noise from being transmitted to the analog circuitry from the digital circuitry and from other outside sources. The noise shielding structure is made of electrically conductive material. In another aspect of the invention, at least one circuit board constructed of a multi-layered construction having at least one inner printed wire pattern is provided. The inner printed wire pattern is set at ground potential with respect to the high frequency output from the analog circuitry. In this manner the inner printed wire pattern serves as a noise shielding member. In addition, the invention obtains effective noise shielding without increasing the size or the manufacturing cost of the device.

43 Claims, 12 Drawing Sheets

WRISTWATCH RADIO COMMUNICATION DEVICE HAVING AN IMPROVED NOISE SHIELDING STRUCTURE

BACKGROUND OF THE INVENTION

This invention relates to a portable radio communication device and, in particular to a wristwatch-type radio communication device having an improved shielding structure for effectively shielding against high frequency noise transmitted to the analog circuitry for receiving radio signals and/or transmitting radio signals.

A variety of portable radio receivers and transmitters such as electronic wristwatches having an FM radio set, a wristwatch-type paging device and the like are currently being manufactured and commercialized. The wristband portion of the device has been utilized to accommodate certain electronic components. For example, in a conventional wristwatch-type radio receiver, the wristband is integrally provided with electrically conductive plates or films to form a loop antenna, when worn on the user's wrist as disclosed in U.S. Pat. No. 4,713,808 issued to Gaskill, European Patent No. 339482 and Japanese Patent Nos. 1046325 and 63252002. These devices disclose wristwatch-type radio receivers with a wristband antenna and the disclosures thereof are incorporated herein by reference as if fully set out herein. However, such wristwatch-type devices have restricted space for mounting electronic components and elements.

Generally, the wristwatch-type radio receiver constructed with a wristband antenna includes a power source battery, signal receiving circuitry and signal processing circuitry accommodated in the housing of the receiver. The signal processing circuitry utilizes digital signals applied to a decoder, a memory and the like. Further, the digital signal processing circuitry is controlled by driving pulse signals. The driving pulse signals are formed with high frequency components. The high frequency components create internal or external noise causing disturbance to the radio signals received by the signal receiving circuitry. Accordingly, the increased noise degrades the signal receiving sensitivity of the radio receiver. The internal noise due to the high frequency components reaches the receiving circuitry directly through the signal lines of the device. On the other hand, the external noise is transmitted to the outside of the device from the digital signal processing circuitry and then received by the receiving circuitry through the wristband antenna.

The prior art has proposed solutions to reduce the internal noise by providing filter elements in the signal lines. In this manner, signals having a certain range of frequency or noise components are not transmitted through the filter elements. In addition, the prior art has proposed an alternative design having a component layout wherein the signal receiving circuitry is separated from the signal processing circuitry in the plane direction of the housing by the maximum distance. This construction was designed to minimize the adverse effect of the noise created by the signal processing circuit. Further, the external noise can be eliminated in the device by enclosing either the signal receiving circuit or the digital circuit (i.e, the noise source) in a shielding box.

However, the above structures of shielding noise are not satisfactory for the wristwatch-type receiving and/or transmitting devices. Since the wristwatch-type device is provided with restricted space for accommodating components, the additional provision of filter elements or shielding boxes makes component layout complicated or near impossible. Further, such approaches increase the cost and size of the device. More specifically, the device is formed too large in the plane direction. This increased size also arises where the signal receiving circuitry is positioned away from the signal processing circuitry in the housing.

It is, therefore, desirable to provide a wristwatch-type receiver having an effective noise shielding structure without increasing the size or the manufacturing cost of the device.

SUMMARY OF THE INVENTION

Generally speaking, in accordance with the invention, a portable radio communication device for processing signals is provided. The device is provided with high frequency analog circuitry for receiving and/or transmitting the signals. Further, digital circuitry is provided for signal processing. A noise shielding member constructed of electrically conductive material is provided for shielding against high frequency noise created in the system. The device is arranged such that the noise shielding member is positioned between the analog circuitry and the digital circuitry in the direction of the thickness of the housing, to prevent a high frequency noise created by the digital circuitry to be transmitted to the analog circuitry. The noise shielding member may form the electrical connection between the analog and digital circuitry.

In one embodiment, the analog circuitry is mounted on a first board, the digital circuitry is mounted on a second board and the first board is sandwiched between the power source battery and the noise shielding member. The potential of the noise shielding member is preferably the same in magnitude and polarity as that of the pole of the battery facing the analog circuitry.

Where the device is provided with a display portion, such as a liquid crystal display panel, the display portion is preferably positioned on the opposite side of the analog circuitry as the noise shielding member. The shielding plate may be provided with engaging portions for engaging the respective first and second boards.

In still another embodiment, a novel wristwatch-type radio communications device is provided having a body portion for accommodating a circuit assembly thereon and a wristband portion. The body portion includes a front casing member and a rear covering member attached to the front member and designed to face the user's wrist. The circuit assembly is received in the space defined by the front and rear members. The circuit assembly includes at least one circuit board having a multi-layered construction with at least one inner printed wire pattern. The analog circuitry for receiving and/or transmitting radio signals is mounted on the first surface of the circuit board and the digital circuitry for signal processing and/or data display are mounted on the second surface of the circuit board. The rear covering member of the body portion is of electrically conductive material and electrically connected to a pole of the power source battery. The inner printed wire pattern of the circuit board is electrically connected either directly or indirectly to a pole of the power source battery. The circuit board is placed on the body portion so that the first surface of the circuit board faces the rear covering member. The inner printed wire pattern and the rear covering member serve as an effective noise shielding member. They are preferably at ground potential to reduce the noise created in the device.

Also, in this construction, the digital circuitry is located outside the circular area defined by the loop antenna to reduce noise penetrating the circular area. The front casing member may also be electrically conductive and coupled to the rear covering member. In this way, the digital circuitry is confined within the noise shielding defined by the front member and inner printed wire pattern of the circuit board.

A part of the digital circuitry may be mounted on the first surface of the circuit board, in which case such digital circuitry may be enclosed by an electrically conductive plate connected to a pole of the power source battery.

In a preferred embodiment of the present invention, the above assembly has first and second multi-layered circuit boards, each having at least one inner printed wire pattern. The first circuit board is for mounting the high frequency analog circuitry and is placed facing the inner side of the rear covering member of the body portion of the device. The second circuit board is for mounting the digital circuitry and is placed facing the inner side of the front casing member of the body portion. Each of the inner printed wire patterns is connected either directly or indirectly to one of the poles of the power source battery. An electrically conductive plate member is also provided between the first and second circuit boards and is connected to one of the poles of the battery. By this arrangement, effective noise shielding can be realized by the rear covering member, inner printed wire patterns and electrically conductive plate member. Preferably the front casing member of the body portion is electrically conductive and connected electrically to the rear covering member.

Accordingly, it is an object of the invention to provide an improved noise shielding structure for a portable radio communication device.

Another object of the invention is to provide an improved noise shielding structure which reduces the number of parts to maintain the small size of the portable radio communication device.

A further object of the invention is to provide an improved noise shielding structure which also improves the efficiency of the device.

Still other objects and advantages of the invention will in part be obvious and will in part be apparent from the specification.

The invention accordingly comprises the features of construction, combinations of elements, arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
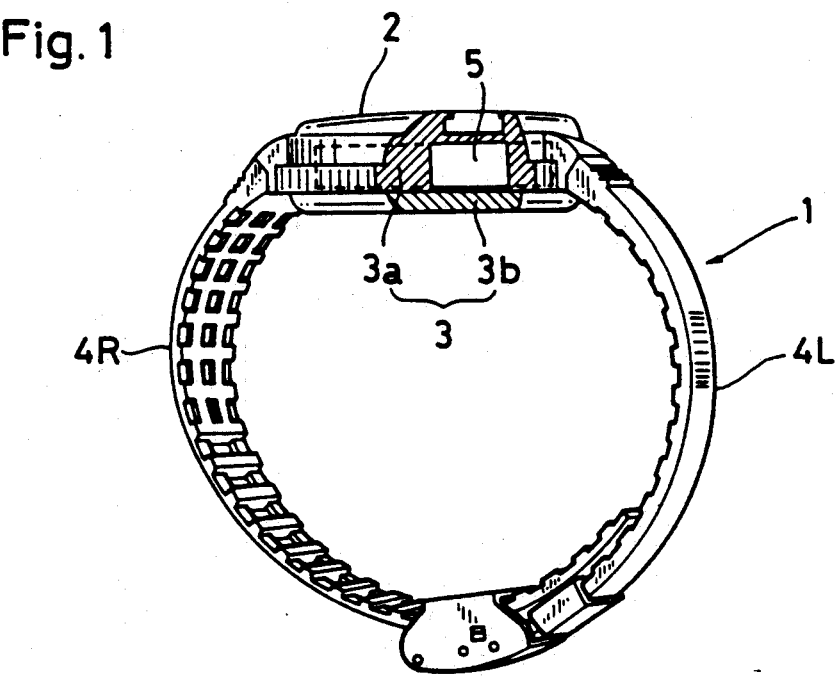
FIG. 1 is a perspective, partially cutaway view of a wristwatch paging receiver and watch band constructed in accordance with a first embodiment of the invention.

Reference is first made to FIG. 1 of the drawings which depicts a wristwatch type paging device (i.e., a portable radio communication device), generally indicated at 1 and constructed in accordance with a first preferred embodiment of the invention. Wristwatch type paging device 1 is provided with a body portion 2 and a pair of wristband segments 4R, 4L. Wristband segments 4R, 4L are attached at their proximal ends to opposite sides of body portion 2 and may be releasably connected to one another at their distal ends. Wristband segments 4R, 4L are further provided with electrically conductive plates (not shown) extending along their respective lengths. Accordingly, when device 1 is worn on a user's wrist and the distal ends of wristband segments 4R, 4L are connected, wristband segments 4R, 4L form a loop antenna. Body portion 2 has a front casing member 3a and a rear covering member 3b fixed to the rear side of front casing member 3a. A circuit assembly 5 is provided in body portion 2 defined by casing member 3a and covering member 3b.

Reference is now made to FIGS. 2A, 2B, 3 and 4, which illustrate the front and rear sides and schematic cross-sections of circuit assembly 5. Circuit assembly 5 is constructed by assembling the components in the thickness direction of body portion 2. Circuit assembly 5 is provided with a panel frame 11 positioned on the front side of body portion 2 and a circuit casing 12 positioned on rear side of body portion 2. Circuit assembly 5 is further provided with a liquid crystal display panel 13, a second circuit board 14 having signal processing circuitry mounted thereon with circuit element 27, a noise shielding plate 15, a spacer 17 and a first circuit board 16 having signal receiving circuitry mounted thereon with circuit elements 26b and 37. Signal processing circuitry includes A/D converters, digital filters, ROMs, RAMs, liquid crystal display drivers and central processing units. An example of suitable signal receiving circuitry is disclosed in U.S. Pat. No. 4,885,802 issued to Ragan, which is incorporated herein by reference as if fully set forth herein. The above components are stacked in the order set forth above respectively from the front side of body portion 2. Further, these components are sandwiched by panel frame 11 and circuit casing 12. Circuit casing 12 is positioned on the rear side of body portion 2 and formed with a recess 12a for accommodating a power source battery 18. Battery 18 is fixed in recess 12a by a battery retainer 19.

Panel frame 11, circuit casing 12 and spacer 17 are formed of non-conductive materials. In the preferred embodiment, a synthetic resin is used. Noise shielding plate 15 is formed of an electrically conductive material and is mounted on second circuit board 14 through an insulating layer.

In the preferred embodiment, noise shielding plate 15 is constructed from stainless steel (i.e., SUS 15-7PH). The stainless steel is plated with two layers. The inner plating layer adjacent the stainless steel is nickel, while the outer plating layer on the nickel layer is of gold. The stainless steel plate is constructed in the range of between 0.1 and 0.3 mm in thickness. In the preferred embodiment, the stainless steel plate has a thickness of 0.15 mm. Further, the nickel plated layer may be formed in the range between 1 to 3 $\mu$m in thickness, while the gold plated layer is formed with a thickness of 0.1 $\mu$m.

Figures 2A, 2B:
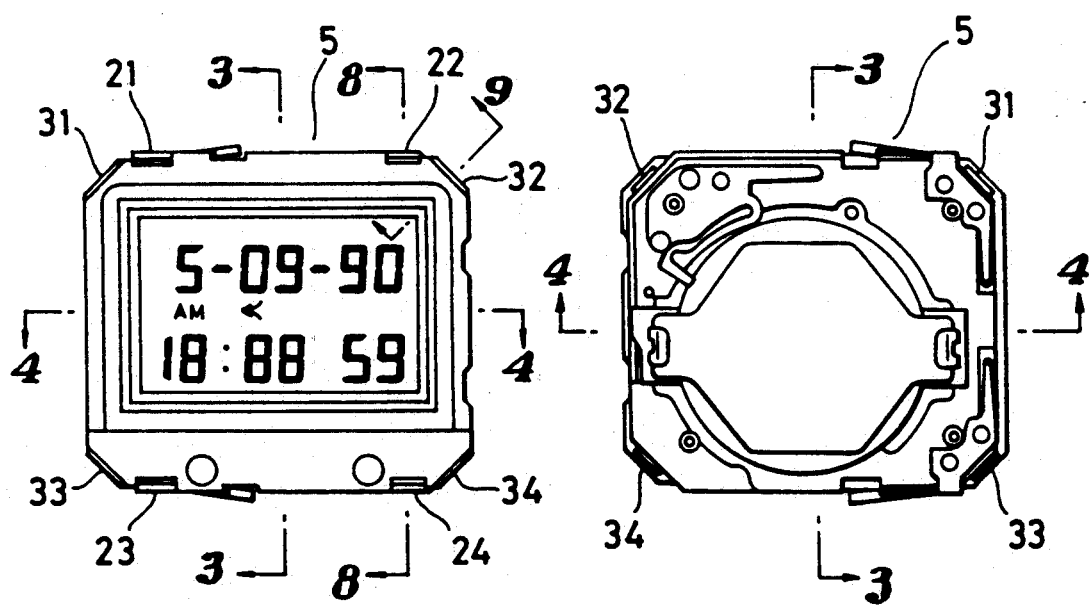
FIG. 2A is a top plan view of the circuit assembly of FIG. 1.
FIG. 2B is a bottom plan view of the circuit assembly of FIG. 1.
Figure 3:
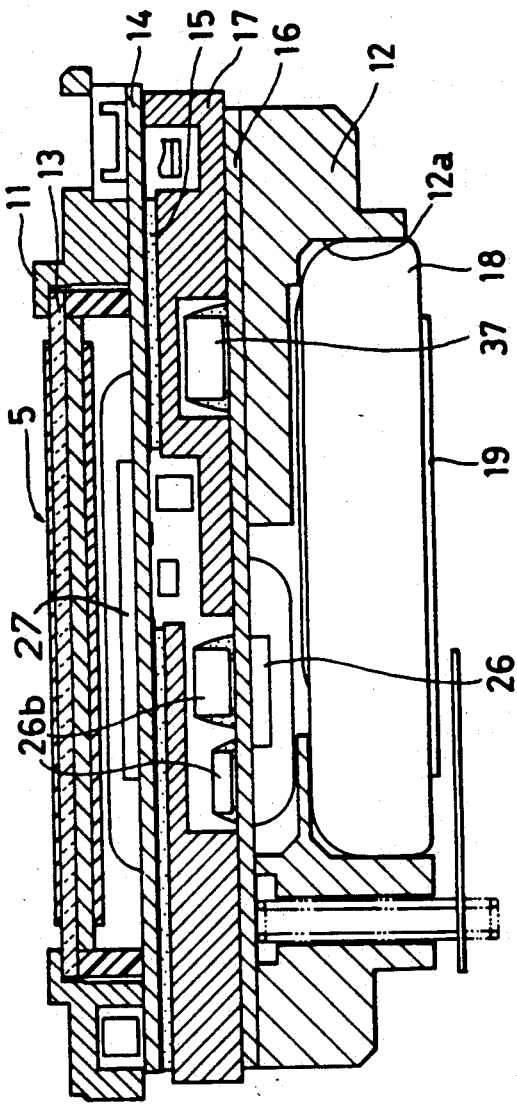
FIG. 3 is an enlarged schematic sectional view of the circuit assembly taken along lines 3—3 of FIGS. 2A and 2B
Figure 4:
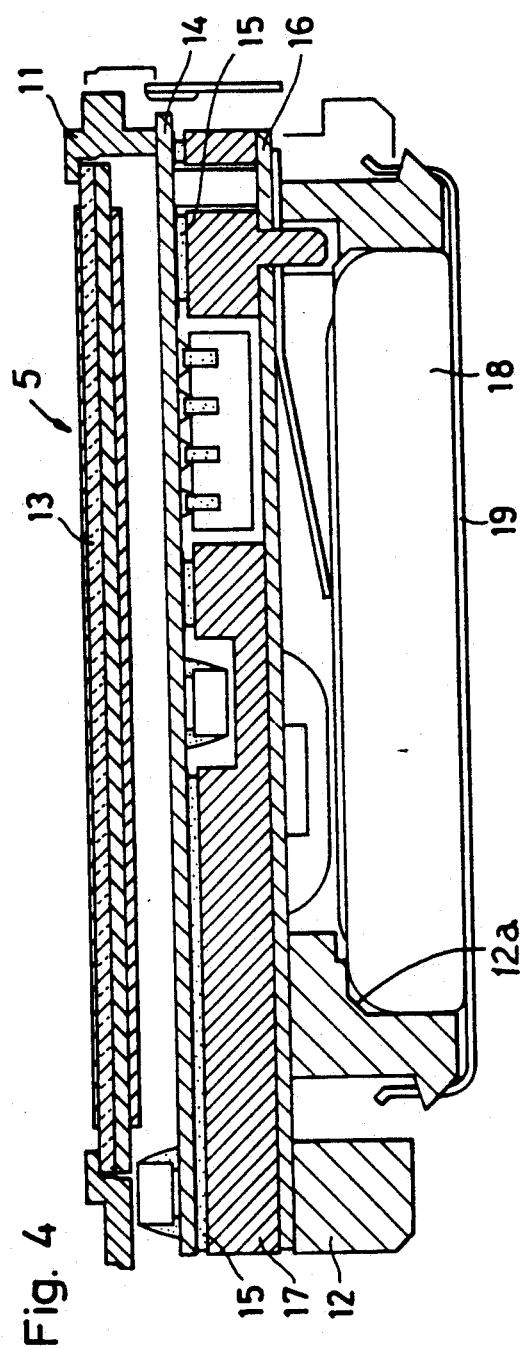
FIG. 4 is an enlarged schematic sectional view of the circuit assembly taken along lines 4—4 of FIGS. 2A and 2B.

Noise shielding plate 15 electrically connects first circuit board 16 and second circuit board 14 as will be set forth below. Power source battery 18 is inserted in recess 12a with a negative pole 18a directed towards first circuit board 16. To maintain the components in the desired configuration of circuit assembly 5, a plurality of engaging members are provided between the panel frame 11 and noise shielding plate 15 and a plurality of engaging members are provided between noise shielding plate 15 and circuit casing 12 as shown in FIGS. 2A and 2B. The description of the engaging members is set forth below.

Figure 5:
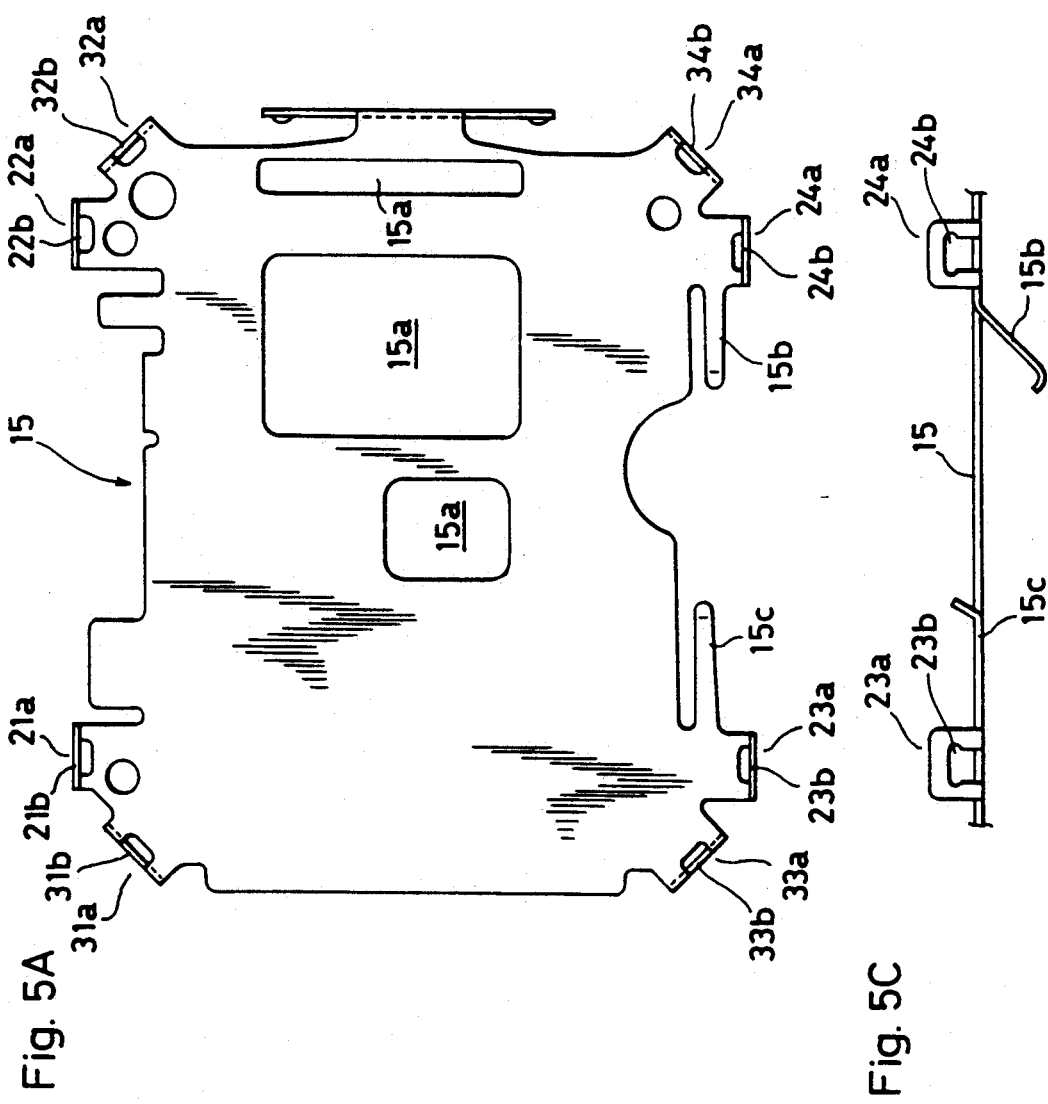
FIG. 5A is a plan view of a shielding member provided in the wristwatch paging receiver of FIG. 1.
FIG. 5B is a side elevational view of an engaging projection of the shielding member of FIG. 5A.
FIG. 5C is a fragmentary side elevational view of the shielding member of FIG. 5A.

Referring now to FIGS. 5A, 5B and 5C, noise shielding plate 15 is generally formed in a rectangular shape with a plurality of through holes for mounting circuit components and the like. In each of the four corners, noise shielding plate 15 is perpendicularly bent towards the rear of device 1 to form bent portions 31a, 32a, 33a and 34a. Bent portions 31a, 32a, 33a and 34a are substantially the same shape and are formed with engaging holes 31b, 32b, 33b and 34b, respectively. The relationship between bent portion 31a and engaging hole 31b is shown in FIG. 5B. In addition, shielding plate 15 is formed at the ends of its opposed longer sides with two pairs of rectangular bent portions 21a, 22a, 23a and 24a, respectively. Rectangular bent portions 21a, 22a, 23a and 24a are substantially the same shape and are located adjacent to respective bent portions 31a, 32a, 33a and 34a. Further, pairs of rectangular bent portions 21a, 22a and 23a, 24a are formed with pairs of engaging holes 21b, 22b and 23b, 24b. The relationship between rectangular bent portions 23a, 24a with engaging holes 23b, 24b is shown in FIG. 5C. Noise shielding plate 15 is formed with openings therethrough as shown in FIGS. 2A and 2B for receiving components mounted on the facing surfaces of second circuit board 14.

Figure 10:
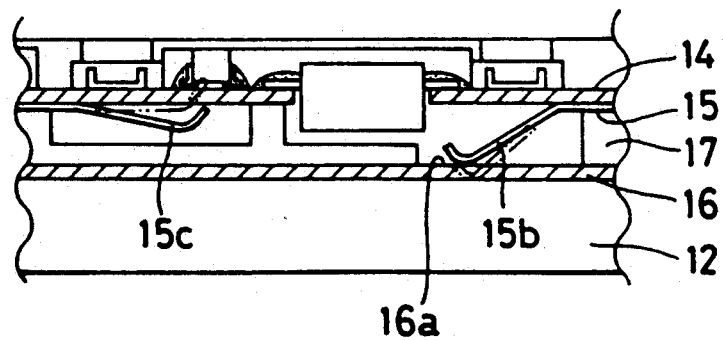
FIG. 10 is an enlarged fragmentary sectional view of FIG. 2A illustrating connecting terminals formed on the shielding member for electrically connecting circuit boards.

In addition, noise shielding plate 15 is formed with a pair of elastic tongue portions 15b and 15b at the side where bent portions 23a and 24a are provided. Tongue portion 15b is designed to abut a predetermined connecting portion (not shown) of first circuit board 16. When circuit assembly 5 is assembled as shown in FIG. 10, tongue portion 15b couples with a certain amount of elastic force to said connecting portion of circuit board 16. Similarly, tongue portion 15b is designed to abut a predetermined connection portion (not shown) of second circuit board 14 in an assembled configuration.

Figure 6:
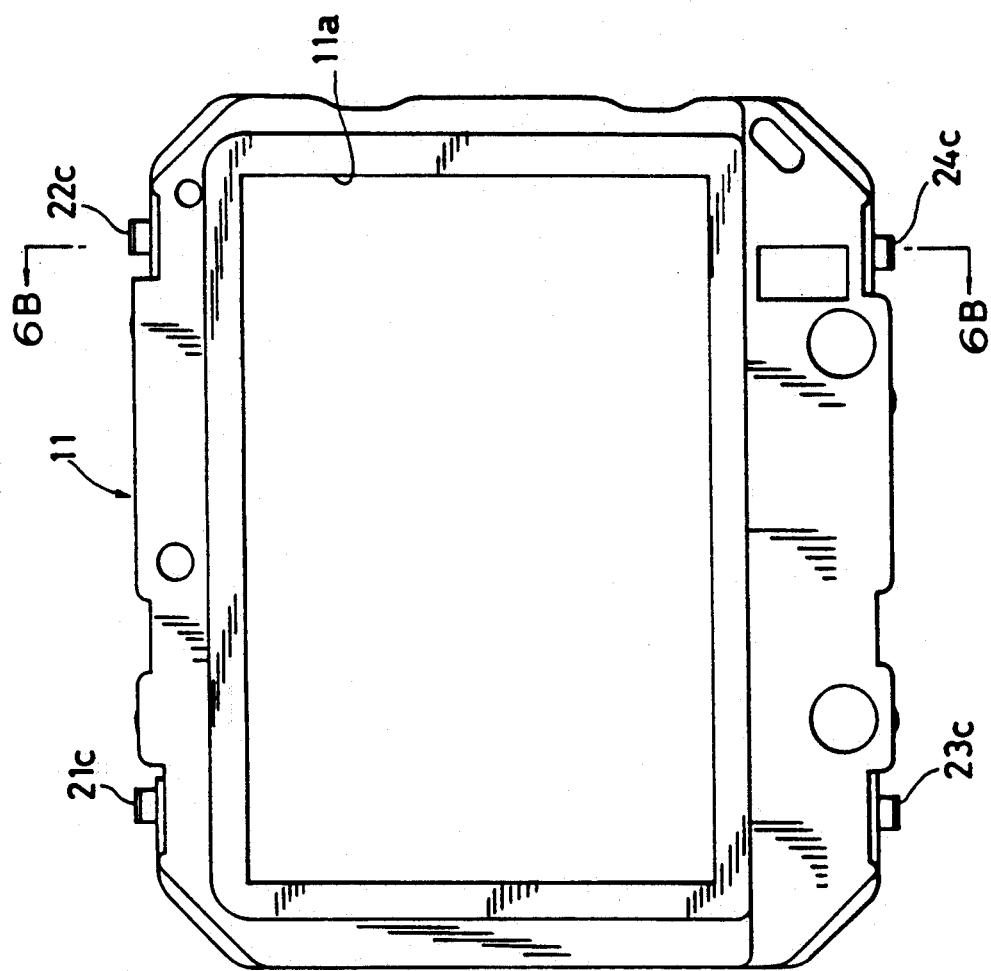
FIG. 6A is an enlarged plan view of a panel frame in the receiver of FIG. 1.
FIG. 6B is an enlarged cross-sectional view of the panel frame taken along lines 6B—6B of FIG. 6A.

Panel frame 11, disclosed in FIGS. 6A and 6B, is formed with a rectangular opening 11a. A liquid crystal display panel 13 is disposed in rectangular opening 11a. Panel frame 11 is provided with two pairs of engaging projections 21c, 22c, 23c and 24c on its longitudinal side ends. When circuit assembly 5 is assembled, projections 21c, 22c, 23c and 24c are located on a portion of panel frame 11 to correspond to and connect with engaging holes 21d, 22d, 23d and 24d, respectively of noise shielding plate 15. Engaging projections 21c, 22c, 23c and 24c are formed with inclined surfaces for camming against bent portions 21a, 22a, 23a and 24a, respectively, to deflect the bent portions during assembly to permit engageabe connection into engaging holes 21d, 22d, 23d and 24d, respectively.

Figure 7:
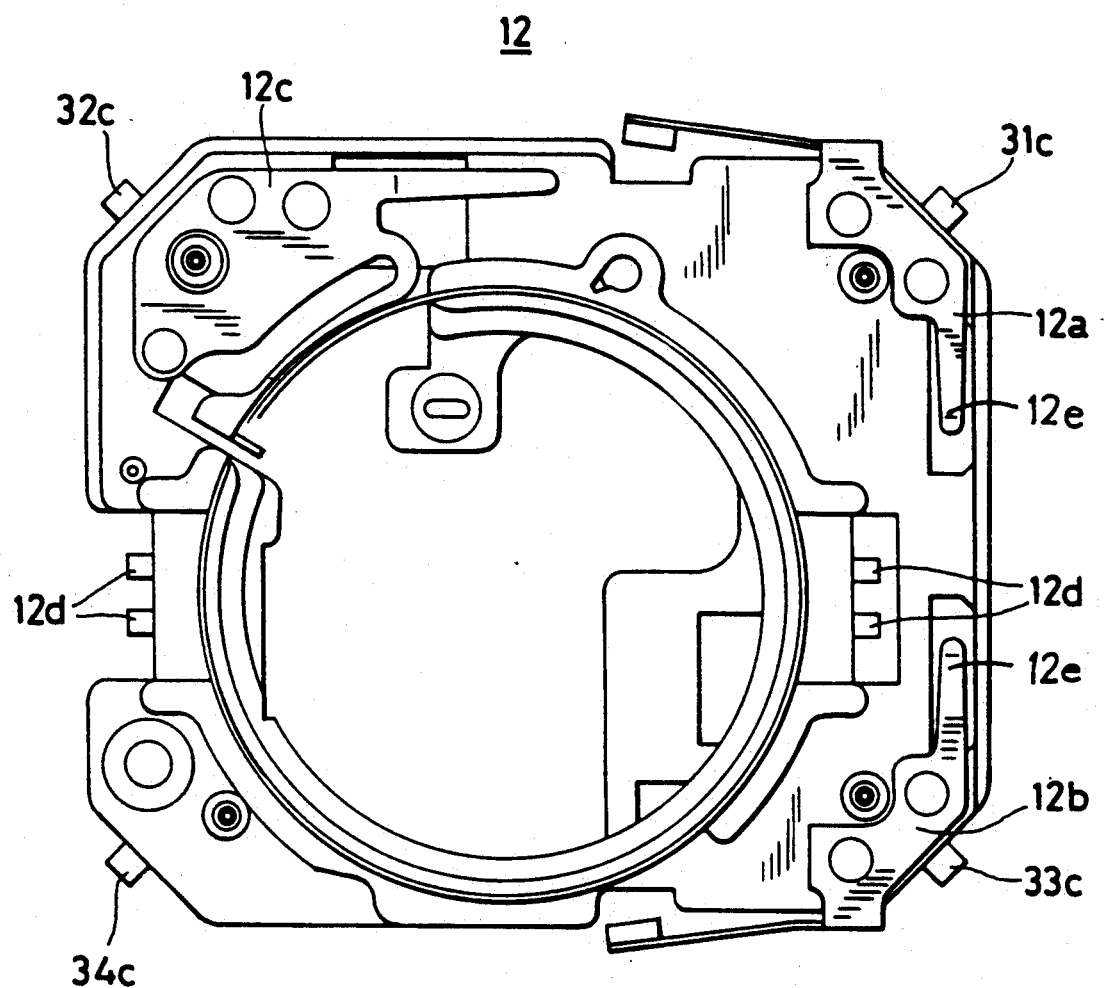
FIG. 7 is an enlarged bottom plan view of a circuit case body of the watch paging receiver of FIG. 1.

Reference is now made to FIG. 7 which illustrates the rear side of circuit casing 12. Circuit casing 12 is integrally formed with engaging projections 31c, 32c, 33c and 34c at its corners. Further, engaging projections 31c, 32c, 33c and 34c are also constructed with triangular projections extending laterally, inclined surfaces facing bent portions cam thereagainst to deflect the bent portions during assembly. When circuit assembly 5 is assembled, engaging projections 31c, 32c, 33c and 34c are positioned to correspond to and connect with engaging holes 31d, 32d, 33d and 34d, respectively, of noise shielding plate 15. Circuit casing 12 is provided with input terminal members 12a, 12b mounted thereon. A pin 12e integrated into circuit casing 12 and extends into first circuit board 16 correspond to input terminal member 12a and 12b in FIG. 7. Pin 12e electrically couples the loop antenna and first circuit board 16. In addition, a positive pole terminal member 12c is provided for connection to power source battery 18. For mounting battery retainer 19 to circuit casing 12, circuit casing 12 is also integrally formed with four engaging projections 12d. Battery retainer 19 is perpendicularly bent towards frame 11. The bent portions of battery retainer 19 are formed with engaging holes (not shown)

into which the associated engaging projections are connected.

Figure 8:
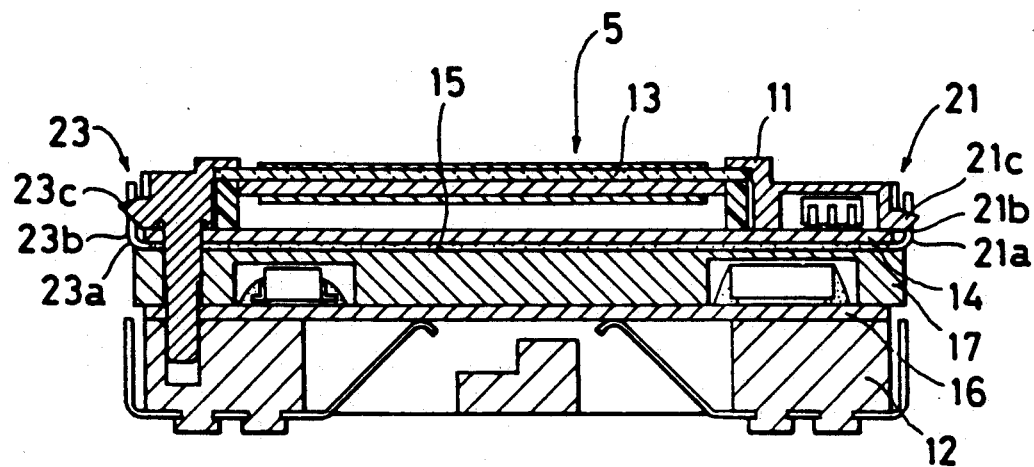
FIG. 8 is an enlarged cross-sectional view taken along lines 8—8 of FIG. 2A.

To assemble circuit assembly 5, the respective components of the assembly are stacked one upon the other. Then, noise shielding plate 15 and panel frame 11 are coupled to one another, while, at the same time, noise shielding plate 15 and circuit casing 12 are coupled to one another. More specifically, engaging projections 21c, 22c, 23c and 24c are inserted into the corresponding engaging hole 21d, 22d, 23d and 24d. As shown in FIG. 8, projections 21c and 23c laterally project through engaging holes 21b and 23b. Accordingly, the upper edges of holes 21b and 23b are hooked on the supper surfaces of projections 21c and 23c, respectively. In this engaged position, panel frame 11, liquid crystal display panel 13, second circuit board 14 and noise shielding plate 15 are integrally connected in an assembled position by the engagement of panel frame 11 and noise shielding plate 15.

Figure 9:
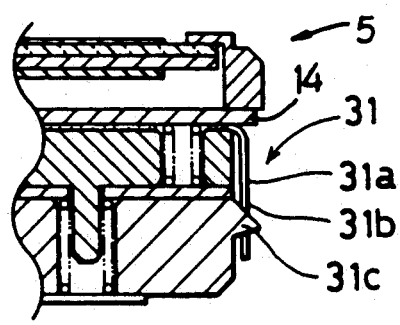
FIG. 9 is a fragmentary enlarged cross-sectional view taken along lines 9—9 of FIG. 2A.

Similarly, engaging projections 31c, 32c, 33c and 34c are inserted into the corresponding engaging hole 31b, 32b, 33b and 34b. As shown in FIG. 9, the lower edges of the holes 31b, 32b, 33b and 34b are hooked on the lower surfaces of projections 31c, 32c, 33c and 34c. The engaging method corresponding to engaging projections 31c, 32c, 33c and 34c and engaging holes 31b, 32b, 33b and 34b is reverse to that of engaging projections 21c, 22c, 23c and 24c and engaging holes 21b, 22b, 23b and 24b. In this method, noise shielding plate 15, spacer 17, first circuit board 16 and circuit casing 12 are in an assembled condition. Thus, circuit assembly 5 is connected in an assembled position by engaging projections 21c, 22c, 23c and 24c and engaging holes 21b, 22b, 23b and 24b and engaging projections 31c, 32c, 33c and 34c and engaging holes 31b, 32b, 33b and 34b. In an alternative embodiment, the engagement of noise shielding plate 15, panel frame 11 and circuit 12 casing may be obtained by a different locking mechanism. For example, hooks and grooves may be utilized to form the engaging mechanism.

Referring now to FIG. 10, when circuit assembly 5 is assembled, elastic tongue portions 15b and 15b of noise shielding plate 15 form a contact with first circuit board 16 and second circuit board 14, respectively. Elastic tongue portion 15b projects toward first circuit board 16 by an amount greater than the thickness of spacer 17. In the assembled configuration, elastic tongue portion 15b is elastically deformed from the position represented by a phantom line to the position represented by a solid line. Therefore, elastic tongue portion 15b presses with a certain amount of elastic force onto a connecting portion of first circuit board 16. Similarly, elastic tongue portion 15c projects with a certain amount of elastic force toward and onto a connecting portion of second circuit board 14.

Since noise shielding plate 15 is formed from an electrically conductive material, first circuit board 16 is electrically connected with second circuit board 14 through the noise shielding plate 15. The electrical path formed between first circuit board 16 and second circuit board 14 is preferably utilized as a conduit for power source battery 18. In addition, the electrical path may be utilized for transferring signals except noise sources.

Reference is now made to FIGS. 11-15 of the drawings which depict a wristwatch radio communication device having a noise shielding structure, generally indicated at 100, and constructed in accordance with another preferred embodiment of the invention. Device 100 is substantially provided with the same external structure as that of device 1 of FIG. 1.

Device 100 is formed with a body portion 101 and a pair of wristband segments 102R, 102L. Body portion 101 is defined by a front casing member 101a and a rear covering member 101b. First casing member 101a and rear covering member 101b are fixed together to form a hollow space 100d. Hollow space 101d is provided with an inner circuit assembly 103. Front casing member 101a and rear covering member 101b are constructed of an electrically conductive material and are coupled together by a plurality of electrically conductive screws 101c. Wristband segments 102R and 102L are integrally provided with electrically conductive thin plates 104R, 104L, respectively. Plates 104R, 104L are connected at their proximal ends to inner circuit assembly 103. When device 100 is worn on the user's wrist, plates 104R, 104L are designed to form a loop antenna for receiving and transmitting radio signals.

Figure 12:
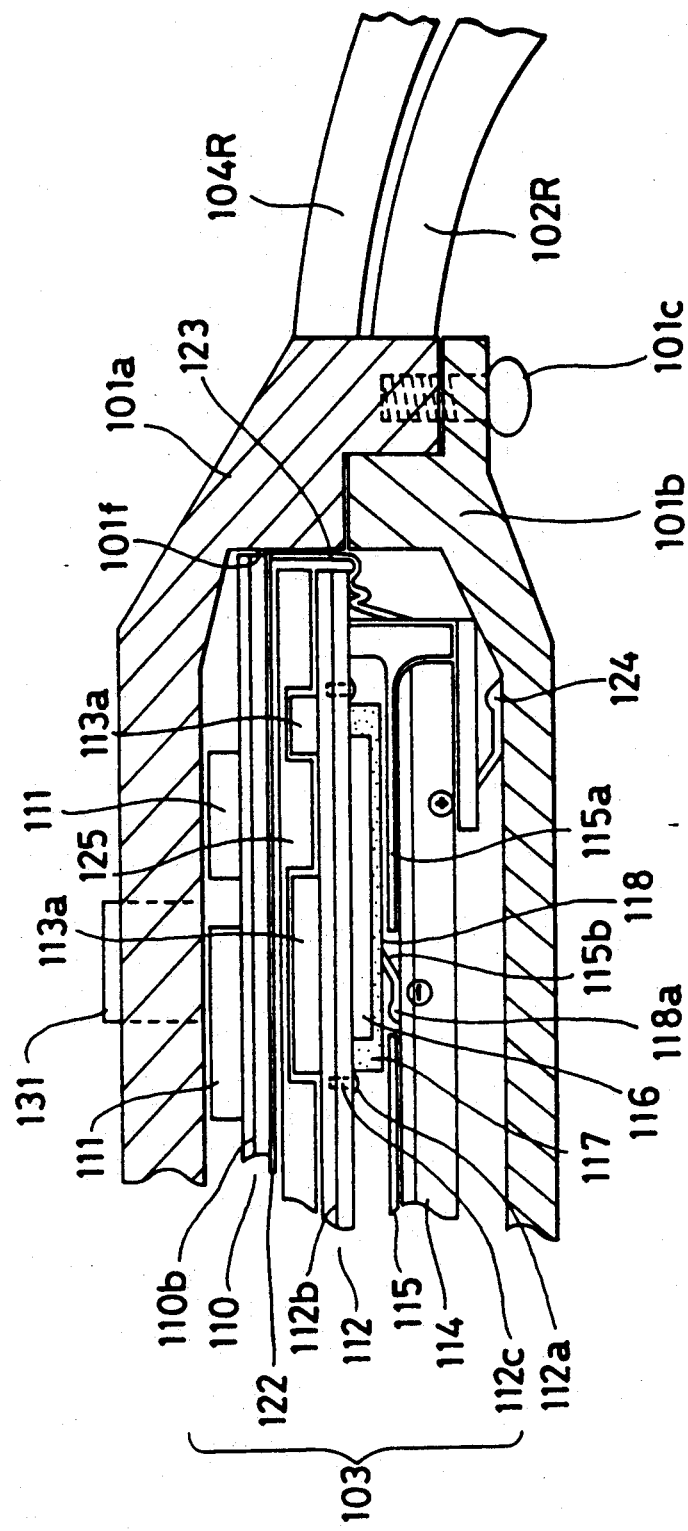
FIG. 12 is an enlarged fragmentary side elevational view of FIG. 11.

As more particularly shown in FIG. 12, inner circuit assembly 103 is provided with a second circuit board 110, a first circuit board 112, and a button-shaped battery 114. Digital circuitry 111 for data decoding and display is mounted on second circuit board 110. High frequency analog circuitry 113 for receiving and transmitting radio signals is mounted on first circuit board 112. High frequency analog circuitry 113 is disclosed in U.S. Pat. No. 4,885,802 issued to Ragan and is incorporated herein by reference. A battery fixing 115 is provided to accommodate button-shaped battery 114.

Second circuit board 110, first circuit board 112 and battery 114 are arranged respectively from the front side of body portion 101 to the rear side of body portion 101. First circuit board 112 has a multi-layered construction with at least one inner wire pattern 112b. High frequency analog circuitry 113 is mounted on the rear surface of first circuit board 112 facing rear covering member 101b. A plurality of electronic components 113a are mounted on the front-side surface of first circuit board 112. Electronic components 113a are provided to drive high frequency analog circuitry 113.

Each circuit board 110 and 112 are formed with two layers. Inner printed wire pattern 110b and 112b form the inner surface of one of the layers, respectively. Then, the circuit elements are mounted on the outer surfaces of the layers and coupled to its inner printer wire pattern by apertures (not shown) through the layers to form an interface therebetween. In the preferred embodiment, inner printed wire patterns 110b and 112b are formed from copper. Further, inner printed wire patterns 110b and 112b have the same potential as either the negative or positive pole of battery 114.

First circuit board 112 is provided on its rear side surface directed toward battery 114 with noise source circuitry 116. Noise source circuitry 116 is constructed with digital circuits for sampling received radio signals prior to signal conversion through an A/D converter, a PLL circuit and the like. Noise source circuitry 116 is embedded in resin material 117. Resin material 117 is entirely enclosed by a first electrically conductive plate 118. Electrically conductive plate 118 is connected to a surface printed wire pattern 112a formed on the rear-side surface of first circuit board 112. Battery frame 115 is formed with a through hole 115b through its bottom portion 115a. Electrically conductive plate 118 also serves as a negative electrode plate for battery 114.

More specifically, electrically conductive plate 118 has a projecting portion 118a which passes through hole 115b of battery frame 115 to contact the negative pole of battery 114. In addition, circuit board 112 is provided with inner wire pattern 112b. Wire pattern 112b is connected to surface printed wire pattern 112a through a hole 112c. Accordingly, first conductive plate 118 and inner printed wire pattern 112b of first circuit board 112 are set to a negative potential. However, first conductive plate 118 and inner printed wire pattern 112b may be electrically connected to a positive pole or a negative pole of battery 114 through a condenser (not shown).

At the same time, second circuit board 110 has a multi-layered board construction with at least one inner printed wire pattern 110b. Digital circuitry 111 for data decoding and display is mounted on the front-side surface of second circuit board 110. A liquid crystal display panel 121 (FIG. 12) is positioned between second circuit board 110 and front casing member 101a of body portion 101. The display area of panel 121 is outwardly exposed through an opening of front casing member 101a. A second electrically conductive plate 122 is superposed on the rear-side surface of second circuit board 110. Second electrically conductive plate 122 is attached at its side end portion to an inner side surface 101f of casing member 101a of body portion 101.

Further, inner side surface 101f of casing member 101a is provided with an electrode member 123 connected to second conductive plate 122. Electrode member 123 is coupled to second conductive plate 122 which is further connected to inner printed wire pattern 110b of second circuit board 110 through a hole (not shown) formed in second circuit board 110. A positive electrode member 124 is firmly attached to the inner surface of the covering member 101b of body portion 101. In this configuration, electrode member 123 is coupled to positive electrode member 124. The end of positive electrode member 124 is connected to the positive pole of battery 114. Further, an insulating spacer 125 is interposed between second conductive plate 122 and first circuit board 112.

In the assembled position, second conductive plate 122 and inner printed wire pattern 110b are both connected having a positive potential. In addition, casing member 101a, covering member 101b and electrode members 123, 124 are connected at a positive potential.

In radio communication device 100, high frequency analog circuitry 113 is enclosed by inner printed wire pattern 112b and rear covering member 101b. Further, inner printed wire pattern 112b and covering member 101b are connected to the positive pole of battery 114. Since inner printed wire pattern 112b and covering member 101b are at ground potential intermittently from the high frequency, a noise shield for the analog circuitry 113 is created. Therefore, other shielding members or devices such as shielding boxes are not required. Accordingly, the circuit assembly can be simplified in structure and reduced in size.

In addition, digital circuitry 111 is mounted on the front side surface of second circuit board 110. In this manner, digital circuitry 111 is located outside the circular area defined by the loop antenna of conductive plates 104R, 104L in wristband segments 102R, 102L. Accordingly, the amount of noise from digital circuitry 111, which enters the circular area of the loop antenna, can be reduced. Further, the amount of noise reaching the analog circuitry through the loop antenna can be reduced.

In device 100, casing member 101a of the body portion 101 is constructed with electrically conductive material and is coupled to the positive pole of battery 114. Inner printed wire pattern 110b is also coupled to the positive pole of battery 114. Since casing member 101a and inner printed wire pattern 110b are at ground potential, digital circuitry 111 is shielded by the casing member 101a and inner printed wire pattern 110b.

Casing member 101a, covering member 101b, inner printed wire pattern 110b and second conductive plate 122 are coupled to the positive pole of the battery 114. At the same time, inner printed wire pattern 112b and first conductive plate 118 are coupled to the negative pole of the battery 114. However, first conductive plate 118 and inner printed wire pattern 112b may be electrically connected to a positive pole or a negative pole of battery 114 through a condenser (not shown). Since capacitors and other electric elements with good high frequency characteristics are provided and are connected near noise source circuitry 116 with the source lines of both positive and negative polarities, the two polarity sides can be regarded as being connected with each other from the viewpoint of high frequency signals. Therefore, the above mentioned elements are regarded as being at ground potential with respect to high frequency components, irrespective of their polarity. Hence, inner space 101d of body portion 101 is divided into four shielded spaces. The first shielded space is defined by casing member 101a and inner printed wire pattern 110b. The second shielded space is defined by second conductive plate 122 and inner printed wire pattern 112b. The third shielded space is defined by inner printed wire 112b and first conductive plate 118. Finally, the fourth shielded plate is defined by inner printed wire pattern 112b and covering member 101b.

Figure 11:
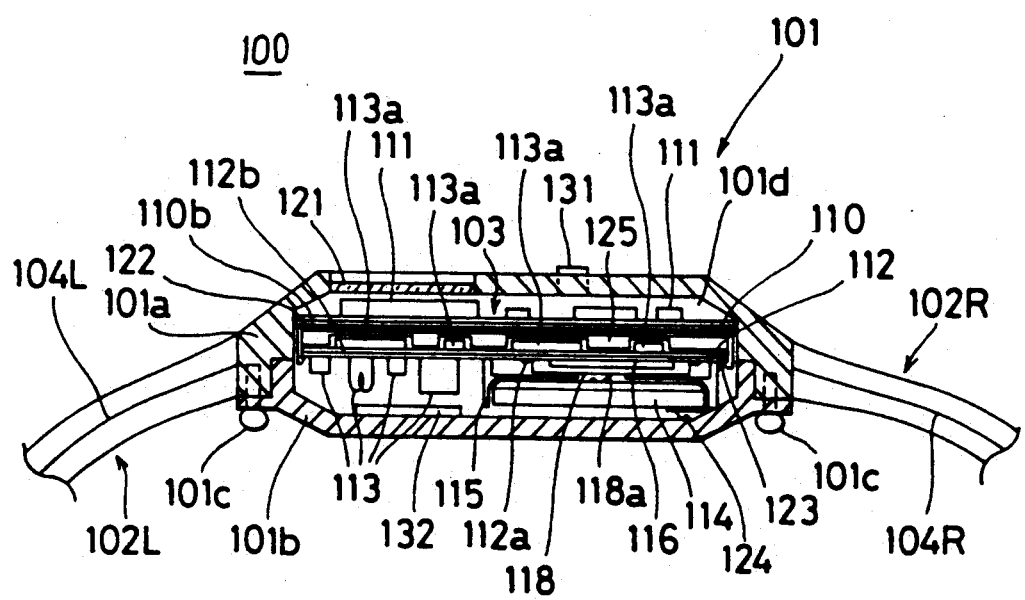
FIG. 11 is a sectional side elevational view of a wristwatch radio communication device constructed in accordance with another embodiment of the invention.

As shown in FIG. 11, digital circuitry 111 is located adjacent to display panel 121 and switches 131. Accordingly, the wiring between digital circuitry 111, display panel 121 and switch 131 can easily be provided so that the signal lines between digital circuitry 111 and display panel 121 can be reduced in length. The shortening of the signal lines reduces noise sources in device 100. Covering member 101b of body portion 101 is connected to the positive pole of battery 114. This arrangement is advantageous for driving a piezo buzzer 132 provided on the inner surface of covering member 101b. Since first conductive plate 118 is directly connected to battery 114, the impedance of first conductive plate 118 is as low as possible. The low impedance prevents high frequency noise from entering first conductive plate 118. Further, noise source circuitry 116 is mounted on the same plane as analog circuitry 113 to reduce the amount of noise transmitted to device 100.

Figure 13:
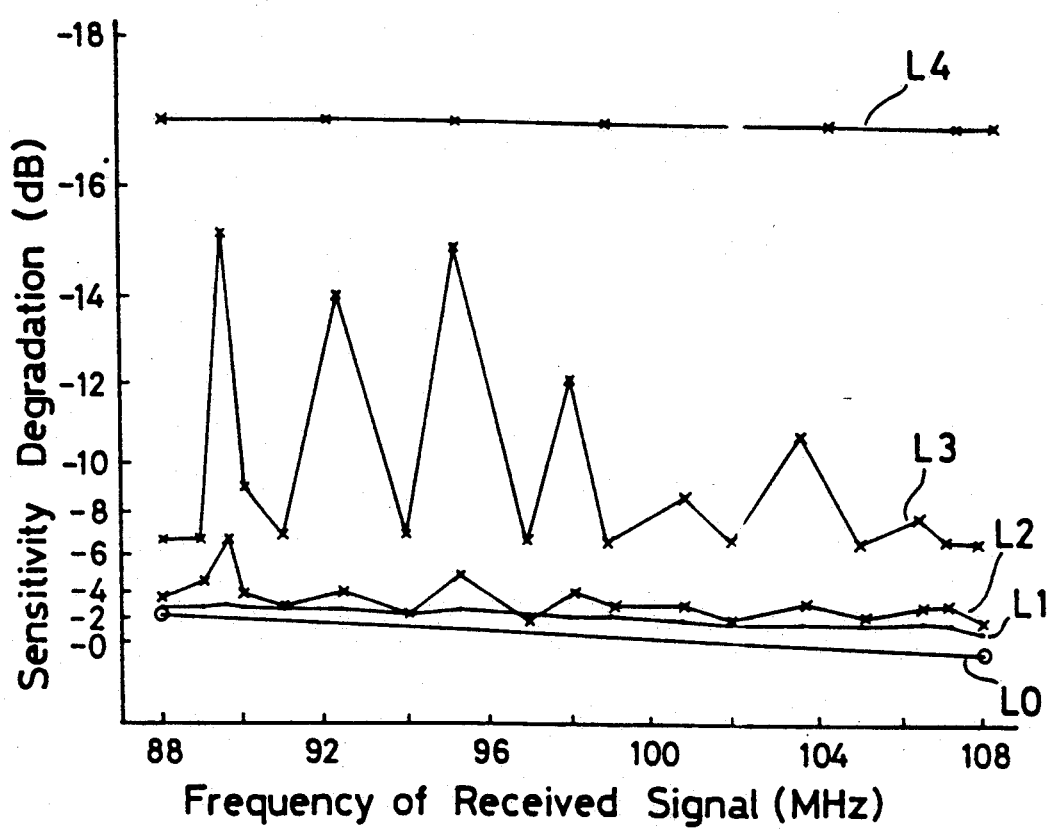
FIG. 13 is a characteristic curve illustrating the change in sensitivity degradation with respect to the receiving frequency.

Reference is now made to FIG. 13 which illustrates the relationship between sensitivity degradation and the frequency of received signals. The relationship compares the sensitivity of device 100 shown in FIGS. 11 and 12 with devices which have no noise shielding structure. Characteristic curve L1 is obtained from radio communication device 100 shown in FIGS. 11 and 12. Characteristic curve L2 is obtained from a device with the same structure as device 100 of FIGS. 11 and 12 except casing member 101a of body portion 101 is constructed of plastic. Characteristic curve L3 is obtained from a device similar to device 100 of FIGS. 11 except casing member 101a and covering member 101b are constructed of plastic and first conductive plate 118 is eliminated. Characteristic curve L4 is obtained from a device similar to device 100 of FIGS. 11 and 12 except that casing member 101a and covering member 101b are constructed of plastic and first conductive plate 118 and second conductive plate 122 are both eliminated. Finally, characteristic curve L0 is obtained by plotting the theoretical limits of the signal receiving sensitivity of device 100 shown in FIGS. 11 and 12. The theoretical limits are defined by the following formula:

$$E = \sqrt{e^2} + NF + CNR - Gd \ (dB\mu V/m) \quad (1)$$

wherein Gd is the gain of the loop antenna and is defined by $$Gd = -10\log\left(1 + \frac{\gamma}{320\left(\frac{\pi}{\lambda}S^2\right)}\right) (dB) \quad (2)$$

NF is the noise factor; $\sqrt{e^2}$ is the equivalent noise induced in the loop antenna (wherein $\bar{e}$ is the effective value); CNR is a signal-to-noise ratio of the input of the detector of an equivalent receiver induced in the loop antenna of the equivalent receiver by which a constant signal-to-noise ratio can be obtained from the output of the receiver; $\tau$ is the high frequency resistance loss of the loop antenna; $\lambda$ is the wave length of the receiver signal; and S is the area encircled by the loop antenna.

If the values of NF, $\sqrt{e^2}$ and CNR are constant, sensitivity E of the receiver is proportional to Gd which depends on the frequency. The greater the frequency, the greater the value of Gd provided that the value of S is fixed as illustrated by the inclination of characteristic L0.

As indicated by FIG. 13, characteristic curve L1 of device 100 differs from the theoretical sensitivity indicated by characteristic curve L0 by no greater than 2 dB. Accordingly, device 100 is formed with an excellent noise shielding structure. In contrast, in the device where noise source circuitry 116 is not covered by first conductive plate 118, characteristic curve L3 demonstrates that the device periodically exhibits very bad sensitivity with respect to changing frequency. The poor sensitivity characteristics is due to noise from noise source circuitry 116. The noise from circuitry 116 enters the antenna and the high frequency circuitry causing the values of $\sqrt{e^2}$ and NF to increase in formula (1) so that the value of sensitivity E increases.

Figure 14:
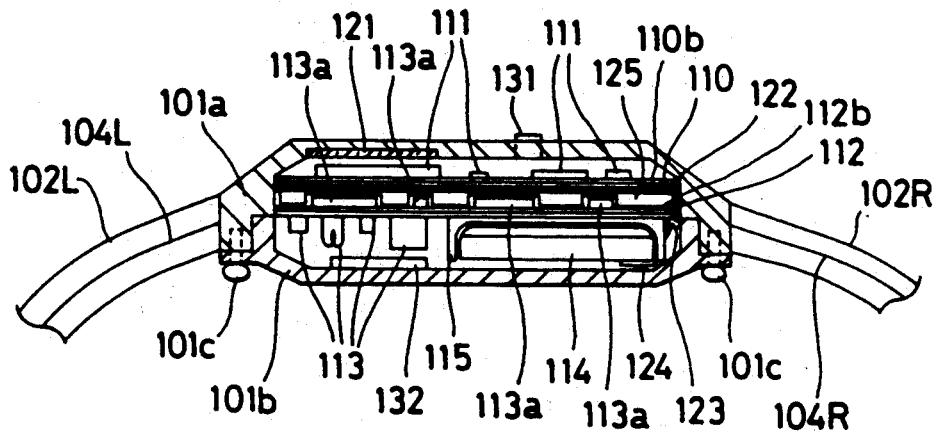
FIG. 14 is a sectional side elevational view of a modified embodiment of FIG. 11 according to the invention.
Figure 15:
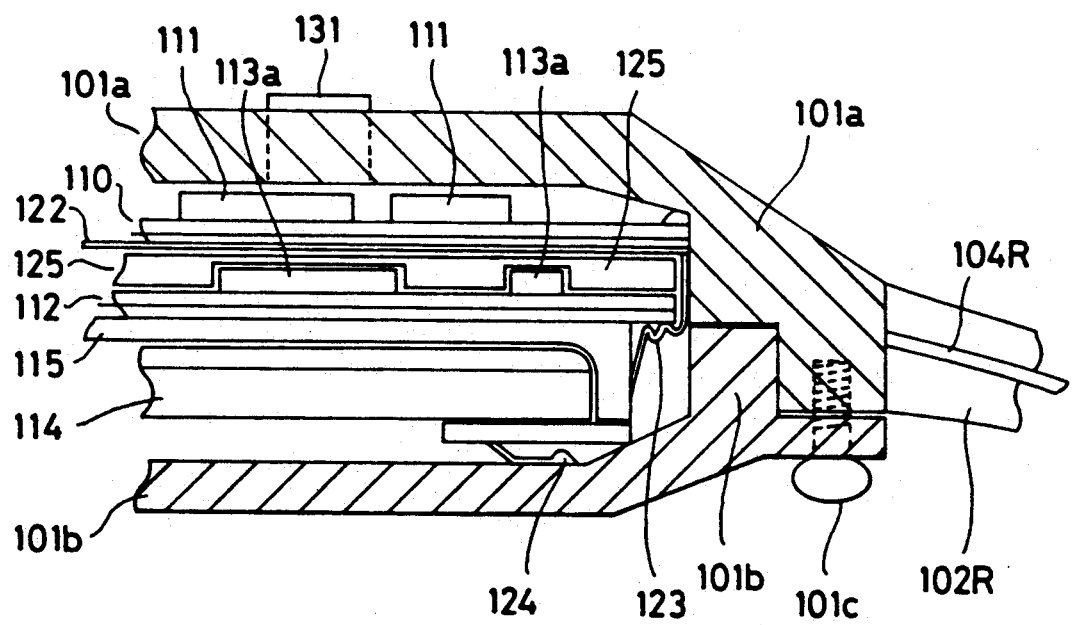
FIG. 15 is an enlarged fragmentary side elevational sectional view of FIG. 14.

In a modified embodiment, noise source circuitry 116 can be removed from first circuit board 112 and mounted on second circuit board 110. In this manner, noise source circuitry 116 and digital circuitry 110 are positioned on the same side of second circuit board 110 as shown in FIGS. 14 and 15, like reference numerals identifying like elements as in the embodiment of FIGS. 11 and 12. Accordingly, first conductive plate 118 can be eliminated. Further, inner printed wire pattern 112b can be connected to the positive side of battery 114 through electrode members 123 and 124. Analog circuitry 113 and noise source circuitry 116 can be constructed as either an integral circuit type or a discrete circuit type. Similarly, digital circuitry 111 can be constructed as either an integrated circuit type or a discrete circuit type.

Figure 16:
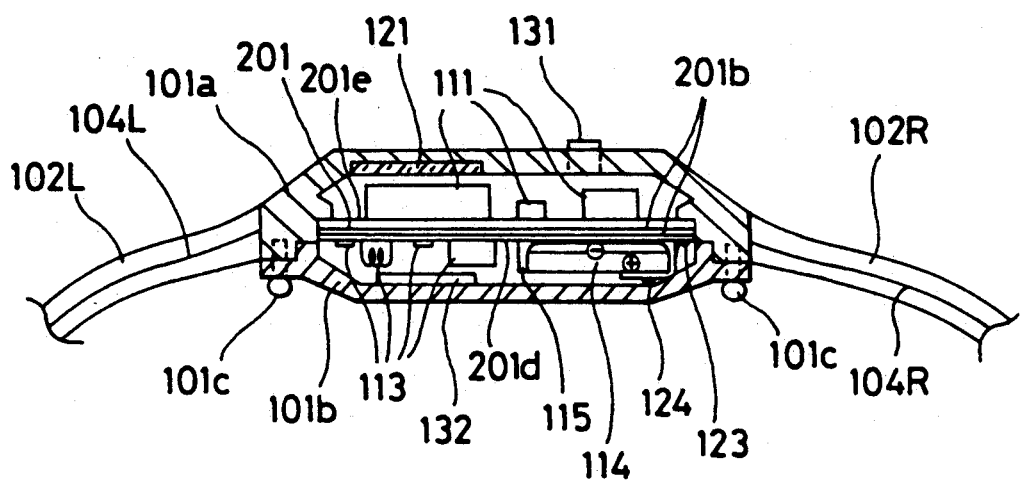
FIG. 16 is a sectional side elevational view of a wristwatch paging receiver constructed in accordance with still another embodiment of the invention.
Figure 17:
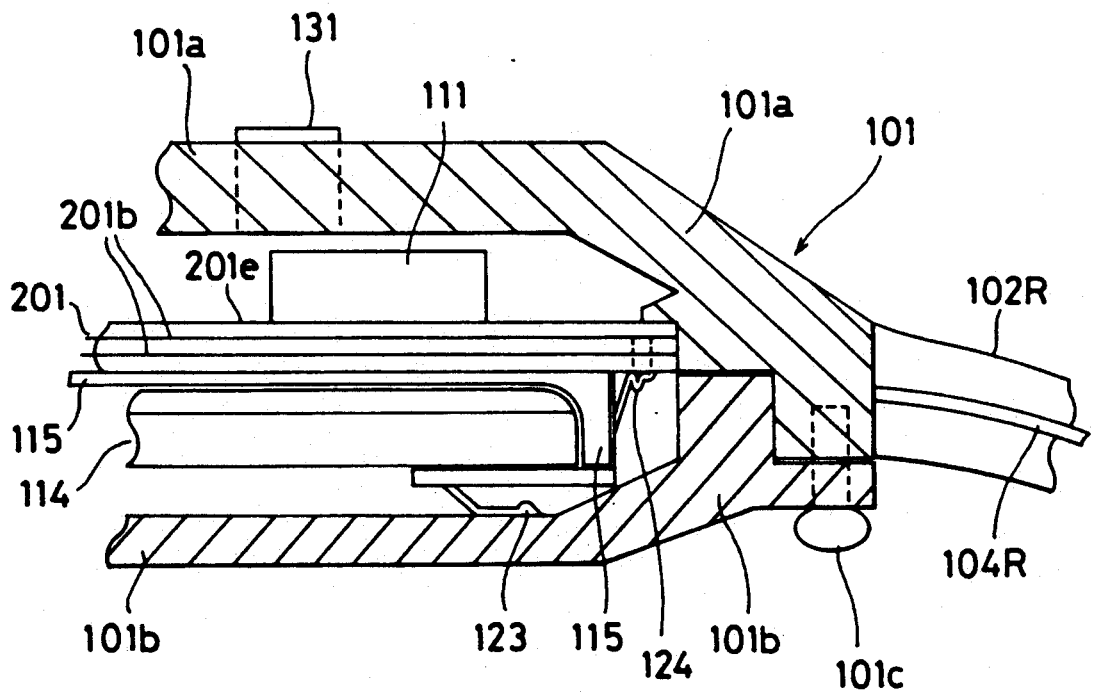
FIG. 17 is an enlarged fragmentary side elevational sectional view of FIG. 16.

Reference is now made to FIGS. 16 and 17 which illustrate another embodiment of the invention. A wristwatch type radio communication device 200 is provided with a similar structure to that of device 100 of FIGS. 11 and 12. Like reference numerals are provided in device 200 to designate those parts identical in device 100 and the explanation thereof is abbreviated.

Device 200 is provided with a single circuit board 201 as opposed to first circuit board 112 and second circuit board 110 of device 100 of FIGS. 11 and 12. Circuit board 201 has a multi-layered construction. Circuit board 201 has two inner printed wire patterns 201b as well as surface printed wire patterns (not shown). Analog circuitry 113 for receiving and transmitting radio signals is mounted on a rear-side surface 201d of the circuit board 201. At the same time, digital circuitry 111 for signal processing and display is mounted on a front-side surface 201e of circuit board 201. Button-type battery 114 is accommodated in battery fixing frame 115 located between circuit board 201 and rear covering member 101b of body portion 101. Inner printed wire pattern 201b is coupled to the positive pole of battery 114 through electrode members 123 and 124. Accordingly, analog circuitry 113 is enclosed by the noise shielding portion defined by rear covering member 101b and inner printed wire patterns 201b. In this configuration, rear covering member 101b and inner printed wire patterns 201b coupled to the positive pole of battery 114.

As shown in FIG. 17, to obtain effective noise shielding characteristics, covering member 101b is shaped to substantially enclose the rear side surface of circuit board 201. Electrode member 124 is securely attached to the inner surface of rear covering member 101b in order to obtain an improved electrical connection between electrode member 124 and covering member 101b. In this manner, the impedance of the connection between electrode member 124 and covering member 101b can be suppressed with respect to a high frequency. Preferably, electrode members 123 and 124 are constructed with wide plates to reduce the impedance with respect to a high frequency.

Figure 18:
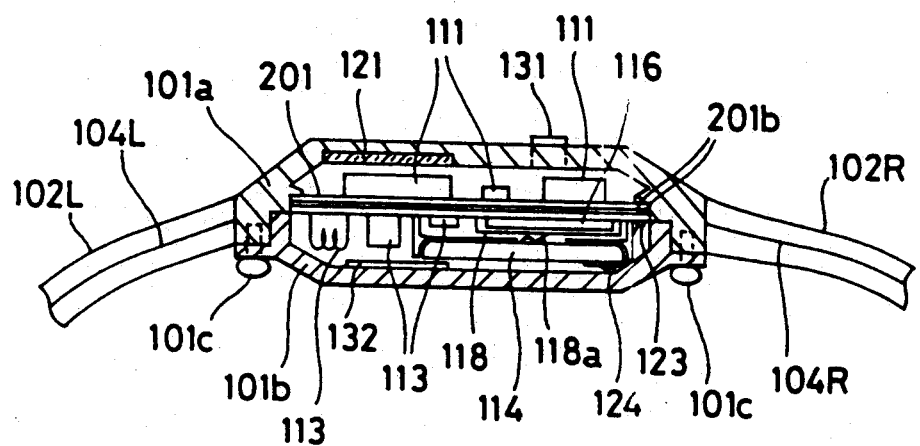
FIG. 18 is a sectional side elevational view of a modified embodiment of FIG. 16 according to the invention.
Figure 19:
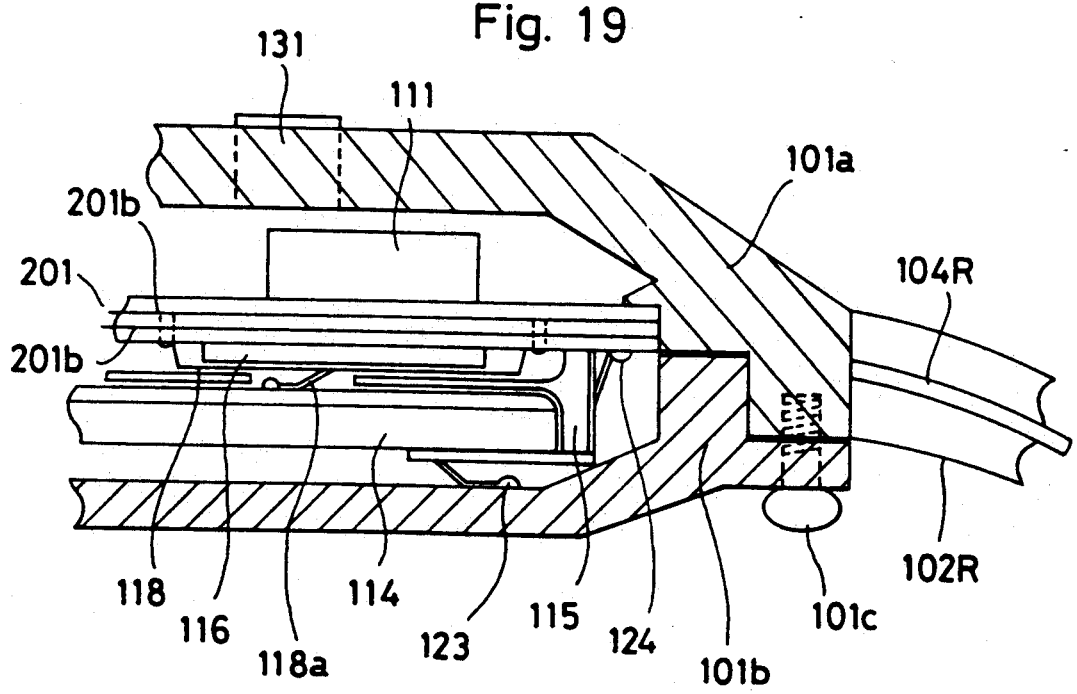
FIG. 19 is an enlarged fragmentary side elevational sectional view of FIG. 18.

As shown in FIGS. 18 and 19, a modification may be to device 200. With the modification, a part of digital circuitry can be mounted on the rear side surface of circuit board 201. In this configuration, digital circuitry 116 is enclosed by an electric conductive plate 118. Further, conductive plate 118 also serves as a negative electrode plate for battery 114. Inner printed wire patterns 201b can be connected to negative electrode plate 118. This embodiment reduces the noise created in modified device 200 by creating a direct contact with electric conductive plate 118 to battery 114, thereby enhancing the sensitivity degradation characteristics.

Accordingly, it is desirable to provide a wristwatch type radio communication device, such as a wristwatch radio communication device, a wristwatch radio receiver, a wristwatch radio transmitter or the like, having a power source battery, signal receiving circuitry and/or transmitting circuitry and signal processing circuitry. The device is provided with signal receiving circuitry and/or transmitting circuitry formed on a first circuit board, signal processing circuitry formed on a second circuit board and a shielding plate member for shielding the signal receiving circuitry and/or the transmitting circuitry from the high frequency noise. The first circuit board and second circuit board are arranged to sandwich the shielding plate member in the thickness direction of the housing of the device.

In this configuration, the noise created by the signal processing circuitry is shielded by the shielding plate member interposed between the signal processing circuitry and the signal receiving circuitry and/or the transmitting circuitry. Therefore, the signal receiving and/or transmitting circuitry is not adversely affected from the noise created by the signal processing circuitry.

In addition, the shielding plate member is an electrically conductive member. Therefore, the shielding plate member forms electrical connections between the first circuit board and the second circuit board. This reduces the number of necessary components connecting elements between the first circuit board and the second circuit board. Preferably, the first circuit board, the power source battery and the shielding plate member are arranged so that the first circuit board is sandwiched between the power source battery and the shielding plate member.

In this arrangement, the signal receiving circuitry and/or transmitting circuitry is shielded on both sides. A first side is shielded by the power source battery. The second side is shielded by the shielding plate member. This arrangement obtains highly effective noise shielding for the signal receiving circuitry and/or the transmitting circuitry. The potential of the shielding plate member has the same magnitude and polarity as that of the power source battery adjacent the signal receiving circuitry and/or transmitting circuitry realizing more effective noise shielding characteristics.

In an alternative embodiment, the radio communication device is provided with a display portion, for example, a liquid crystal display panel. Preferably, the display portion is positioned at the opposite side from the signal receiving circuitry and/or transmitting circuitry with respect to the shielding plate member. Accordingly, noise created by the display portion can be shielded by the shielding plate member.

In a preferred embodiment of the invention, the shielding plate member is provided with engaging portions. The engaging portions engage the respective circuit boards to maintain the first circuit board, shielding plate member and second circuit board in an assembled condition. Preferably, the engaging portion for the first circuit board is formed adjacent to the engaging portion for the second circuit board.

In another aspect of the invention, a wristwatch type radio communication device is provided with a body portion for accommodating a circuit assembly, a wristband portion for mounting the device around the user's wrist attached to the body portion and a loop antenna provided in the wristband portion for receiving and/or transmitting radio waves. The body portion is formed having a front casing member and a rear covering member connected together. The rear covering member is designed to face the user's wrist when the device is worn on the wrist. The front and rear members are connected to define a region for accommodating the circuit assembly.

The circuit assembly is provided with a circuit board having a multi-layered construction with at least one inner printed wire pattern, a high frequency analog circuitry for receiving and/or transmitting radio signals mounted on the first surface of the circuit board, digital circuitry for signal processing and a data display panel mounted on the second surface of the circuit board. The rear covering member of the body portion is formed with electrically conductive material. Further, the rear covering member is electrically connected to one of the poles of the power source battery. In addition, the inner printed wire pattern of the circuit board is electrically connected to one of the poles of the power source battery. In this arrangement, the circuit board is placed in the body portion of the device so that the first surface of the circuit board faces the inner side of the rear covering member of the body portion.

The high frequency analog circuitry is enclosed by the inner wire pattern of the circuit board and the rear covering member of the body portion. Since the analog circuitry is at a high frequency, the inner wire pattern and the rear covering member are at ground potential. Thus, effective shielding against high frequency noise is obtained by the arrangement of the inner printed wire pattern and the rear covering member. In addition, when the device is worn on the user's wrist, the digital circuitry is located outside the circular area defined by the loop antenna.

In this manner, the noise can be reduced from the digital circuitry penetrating the circular area within the loop antenna. Hence, noise also reaching the analog circuitry can be reduced through the antenna. Preferably, the front casing member of the body portion is also formed from electrically conductive material. The first casing member is connected to the rear covering member. In this arrangement, the noise produced by the digital circuitry is enclosed by the noise shielding region defined by the front member and the inner wire pattern of the multi-layered circuit board.

Further, part of the digital circuitry can be mounted on the first surface of the circuit board. Therefore, the digital circuitry mounted on the first surface is enclosed by an electrically conductive plate connected to one of the poles of the power source battery.

In an another preferred embodiment of the invention, the circuit assembly has a first multi-layered circuit board and a second multi-layered circuit boards wherein each circuit board has at least one inner printed wire pattern. The first circuit board is directed towards the inner side of the rear covering member of the body portion of the device for mounting the high frequency analog circuitry. The second circuit board is provided for mounting the digital circuitry. Each of the inner printed wire patterns is coupled to one of the poles of the power source battery.

An electrically conductive plate member is also provided between the first circuit board and the second circuit board. The electrically conductive plate member is coupled to one of the poles of the battery. According to this arrangement, effective noise shielding can be obtained by the rear covering member, inner printed wire patterns and electrically conductive plate member. Preferably, the front casing member of the body portion is electrically conductive and electrically coupled to the rear covering member.

A part of the digital circuitry can be mounted on the first circuit board. In this configuration, the digital circuitry is mounted on the first circuit board to be enclosed by an electrically conductive plate connected to one of the poles of the power source battery.

Accordingly, the invention provides an improved noise shielding structure in a wristwatch radio communication device. The device has at least one signal receiving function which can be maintained in the desired condition without lowering the efficiency of the device, increasing manufacturing cost or the size of the device.

It will thus be seen that the objects set forth above, among those made apparent from the preceding description, are efficiently attained and, since certain changes may be made in the above constructions, without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A wristwatch communication device for processing signals comprising:
    a body portion;
    a wristband portion for fastening around a user's wrist and secured to said body portion;
    an electrically conductive plate formed in said wristband portion to form a loop antenna for one of receiving and transmitting signals when fastened around said user's wrist;
    first circuit means accommodated in said body portion for at least one of receiving and transmitting said signals, said loop antenna being operatively coupled to said first circuit means;
    second circuit means accommodated in said body portion for operating on said signals;
    noise shielding means for shielding said first circuit means from said second circuit means wherein said first circuit means, said noise shielding means and said second circuit means are arranged in that order in the thickness direction of the device, so that said noise shielding means isolates said first circuit means from said second circuit means, said first circuit means being operatively coupled to said second circuit means at least in part by said noise shielding means;
    first engaging means for mechanically coupling said first circuit means to said noise shielding means, including at least one first projection on one of said noise shielding means and said first circuit means and at least one first engaging hole on the other of said noise shielding means and said first circuit means for receiving a first projection; and
    second engaging means for mechanically coupling said second circuit means and said noise shielding means and including at least one second projection on one of said holes shielding means and said second circuit means, and at least one second engaging hole on the other of said noise shielding means and said first circuit means for receiving a second projection.

2. The wristwatch communication device of claim 1, further including power source means for supplying power to said wristwatch communication device and operatively coupled to at least said first circuit means.

3. The wristwatch communication device of claim 1, wherein said first circuit means, said noise shielding means and said second circuit means are arranged in that order in the thickness direction of said body portion.

4. The wristwatch communication device of claim 2, further including a first circuit board and a second circuit board, said first circuit means being mounted on said first circuit board and said second circuit means being mounted on said second circuit board.

5. The wristwatch communication device of claim 1, further including display means for displaying information from said signals disposed on the opposite side of said noise shielding means from the side on which said first circuit means is located.

6. The wristwatch communication device of claim 1, wherein said noise shielding means is formed of an electrically conductive material, said noise shielding means being at an electrical potential substantially the same as that of the pole of said power source means facing said first circuit means.

7. The wristwatch communication device of claim 6, wherein said first noise shielding means includes a noise shielding portion essentially in the form of a plate.

8. The wristwatch communication device of claim 4, wherein said first and second engaging means mechanically couples said first circuit board and said second circuit board to said noise shielding means, at least one of a first projection and a first engaging hole being formed on said first circuit board and at least one of a second projection and a second engaging hole being formed on said second circuit board.

9. The wristwatch communication device of claim 7, wherein said plate of said noise shielding means includes at least one first tab portion projecting from the plate of said plate in a first direction, said at least one first engaging hole being formed therein, and at least one second tab portion projecting from the plate of said plate in a second direction, said at least one second engaging hole being formed therein, said at least one first and second tab portions being displaceable to permit first and second projections respectively on said first and second circuit means to enter said first and second engaging holes.

10. The wristwatch communication device of claim 1, wherein said first circuit means includes high frequency analog circuitry.

11. The wristwatch communication device of claim 1, wherein said second circuit means includes digital circuitry.

12. The wristwatch communication device of claim 1, wherein said noise shielding means is formed of a stainless steel core plated with a first layer of nickel and a second layer of gold.

13. The wristwatch communication device of claim 12, wherein said stainless steel is a plate having a thickness of about 0.1 to 0.3 mm.

14. The wristwatch communication device of claim 12, wherein said stainless steel plate has a thickness of about 0.15 mm.

15. The wristwatch communication device of claim 12, wherein said first layer has a thickness in the range of about 1 to 3 $\mu$m.

16. The wristwatch communication device of claim 12, wherein said second layer has a thickness of about 0.1 $\mu$m.

17. A wristwatch device for processing signals comprising:
    first circuit means for at least one of receiving and transmitting said signals;
    second circuit means for operating on said signals;
    noise shielding means for shielding said first circuit means from said second circuit means wherein said first circuit means, said noise shielding means and said second circuit means are arranged in that order in the thickness direction of the device, so that said noise shielding means isolates said first circuit means from said second circuit means; said first circuit means being operatively coupled to said second circuit means at least in part by said noise shielding means;

a body portion for accommodating said first circuit means, said second circuit means and said noise shielding means; and a wristband portion secured to said body portion for fastening around a user's wrist, said wristband portion including an electrically conductive plate integrally formed therein forming a loop antenna for at least one of receiving and transmitting radio signals when fastened around said user's wrist;

wherein said second circuit means is positioned so as to be substantially outside said loop antenna.

18. A wristwatch radio communication device for processing signals comprising:

a body portion;

a wristband portion for fastening around a user's wrist attached to said body portion;

a circuit assembly accommodated in said body portion;

antenna means coupled for at least one of receiving and transmitting said signals coupled to said wristband portion;

said body portion including a first casing member and a second casing member attached to said first casing member to form a hollow center for accommodating said circuit assembly, said second casing member being directed towards said user's wrist when fastened to said user's wrist;

said circuit assembly further including a circuit board having a multi-layered construction including at least one inner printed wire pattern, first circuit means for at least on part performing one of receiving and transmitting said signals mounted on a first surface of said circuit board directed towards said second casing member of said body portion, second circuit means for data processing disposed on a second surface of said circuit board directed toward said first casing member of said body portion and power source means having at least a first pole and a second pole for supplying power to said wristwatch radio communication device, said first and second casing members together enclosing said circuit assembly;

said second casing member being constructed of an electrically conductive material operatively coupled to at least one of said first pole and said second pole of said power source means; and said inner printed wire pattern being operatively coupled to at least one of said first and said second pole of said power source means.

19. The wristwatch radio communication device of claim 18, wherein said first casing member of said body portion is constructed of an electrically conductive material and is electrically coupled to said second casing member.

20. The wristwatch radio communication device of claim 19, further including a first electrically conductive plate for substantially enclosing said second circuit means mounted on said second surface of said circuit board, said first electrically conductive plate and said inner printed wire pattern being operatively coupled to at least one of said first pole and said second pole of said power source means.

21. The wristwatch radio communication device of claim 20, wherein said power source means is positioned between said first surface of said circuit board and said second casing member, said first electrically conductive plate also serving as an electrode plate for one of said first pole and said second pole of said power source means directed towards said first surface of said circuit board.

22. The wristwatch radio communication device of claim 19, further including a first electrically conductive plate for substantially enclosing said second circuit means mounted on said second surface of said circuit board, said first electrically conductive plate being operatively coupled to a first pole of said power source means and said inner printed wire pattern being operatively coupled to a second pole of said power source means.

23. The wristwatch radio communication device of claim 18, wherein said first circuit means includes a high frequency analog circuitry.

24. The wristwatch radio communication device of claim 18, wherein said second circuit means includes digital circuitry.

25. The wristwatch radio communication device of claim 18, and including display mounted on said second surface of said circuit board.

26. The wristwatch radio communication device of claim 25, wherein said display means includes a liquid crystal display.

27. The wristwatch radio communication device of claim 18, wherein said antenna means includes a loop antenna provided in said wristband portion.

28. The wristwatch radio communication device of claim 18, wherein said first casing member is a front casing member and said second casing member is a rear covering member.

29. The wristwatch radio communication device of claim 27, wherein said second circuit means is positioned so as to be substantially outside said loop antenna.

30. A wristwatch radio communication device for processing signals comprising:

a body portion;

a wristband portion for fastening around a user's wrist attached to said body portion;

a circuit assembly accommodated in said body portion;

antenna means for at least one of receiving and transmitting said signals coupled to said wristband portion;

said body portion including a first casing member and a second casing member attached to said first casing member to form a hollow center for accommodating said circuit assembly, said second casing member directed towards said user's wrist when fastened to said user's wrist;

said circuit assembly further including a first circuit board having a multi-layered construction with at least one inner printed wire pattern, a second circuit board having a multi-layered construction with at least one inner printed wire pattern disposed between said first circuit board and said first casing member of said body portion, first circuit means for at least one of receiving and transmitting said signals mounted on said first circuit board on the side thereof facing aid second casing member, second circuit means for data processing and display means displaying information from said signals mounted on said second circuit board on the side thereof facing away from said first circuit board, power source means having at least a first pole and a second pole for supplying power to said wristwatch radio communication device disposed between said first circuit board and said second casing member, and first electrical conductive means positioned for controlling the potential between said first circuit board and said second circuit board for providing noise shielding therebetween;

said second casing member being constructed of electrically conductive material coupled to at least one of said first pole and said second pole of said power source means;

said inner printed wire patterns of said first circuit board and said second circuit board being operatively coupled to at least one of said first pole and said second pole of said power source means; and said first electrical conductive means being operatively coupled to at least one of said first pole and said second pole of said power source means.

31. The wristwatch radio communication device of claim 30, wherein said first casing member of said body portion constructed of an electrically conductive material and is electrically coupled to said second casing.

32. The wristwatch radio communication device of claim 30, and including display means for displaying information from said signals disposed between said second circuit board and said first casing member.

33. The wristwatch radio communication device of claim 31, further including third circuit means including digital circuitry for in part processing input and output of said first circuit means and mounted on said first circuit board on the side thereof facing said second casing member and a second electrical conductive means positioned between said second casing member and said third circuit means positioned on said first circuit board operatively, said third circuit means being substantially enclosed by said second electrical conductive means, said second electrical conductive means being operatively coupled to at least one of said first pole and said second pole of said power source means.

34. The wristwatch radio communication device of claim 33, wherein said third circuit means and said second electrical conductive means are directed towards said power source means, said second electrical conductive means also serving as an electrode plate for said at least one of said first pole and said second pole of said power source means.

35. The wristwatch radio communication device of claim 34, wherein said first casing member of said body portion is constructed of electrically conductive material and is electrically coupled to said second casing means.

36. The wristwatch radio communication device of claim 30, wherein said first circuit means includes a high frequency circuitry.

37. The wristwatch radio communication device of claim 30, wherein said second circuit means includes digital circuitry.

38. The wristwatch radio communication device of claim 32, wherein said display means includes a liquid crystal display.

39. The wristwatch radio communication device of claim 30, wherein said antenna means includes a loop antenna provided in said wristband portion.

40. The wristwatch radio communication device of claim 30, wherein said first casing member is a front casing member and said second casing member is a rear covering member.

41. The wristwatch radio communication device of claim 30, wherein said first electrical conductive means includes an electrically conductive plate.

42. The wristwatch radio communication device of claim 33, wherein said second electrical conductive means includes an electrically conductive plate.

43. The wristwatch radio communication device of claim 39, wherein said second circuit means is positioned so as to be substantially outside said loop antenna.

* * * * *